US011273915B2

(12) United States Patent
Rowe et al.

(10) Patent No.: US 11,273,915 B2
(45) Date of Patent: Mar. 15, 2022

(54) MODULAR REFRESHMENT CENTER

(71) Applicant: Textron Aviation Inc., Wichita, KS (US)

(72) Inventors: Frank Joseph Rowe, Wichita, KS (US); Michael Scott Robinson, Wichita, KS (US); David Wayne Davis, Wichita, KS (US); JoAnn Kimbell, Wichita, KS (US); Stephen Fagan, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 919 days.

(21) Appl. No.: 15/795,707

(22) Filed: Oct. 27, 2017

(65) Prior Publication Data

US 2018/0118349 A1 May 3, 2018

Related U.S. Application Data

(60) Provisional application No. 62/413,683, filed on Oct. 27, 2016.

(51) Int. Cl.
*B64D 11/04* (2006.01)
*A47B 61/02* (2006.01)
*A47B 77/04* (2006.01)
*A47B 95/00* (2006.01)

(52) U.S. Cl.
CPC .............. *B64D 11/04* (2013.01); *A47B 61/02* (2013.01); *A47B 77/04* (2013.01); *A47B 95/008* (2013.01)

(58) Field of Classification Search
CPC ... B64D 11/04; B64D 11/003; B64D 11/0007; B64D 2011/0046; B64D 11/0023
See application file for complete search history.

(56) References Cited

U.S. PATENT DOCUMENTS

| 4,778,089 | A | * | 10/1988 | White | B60R 7/10 211/105.3 |
| 5,337,905 | A | * | 8/1994 | Gast | A47B 61/00 211/105.3 |
| 5,890,613 | A | * | 4/1999 | Williams | A45C 7/0045 220/23.4 |

(Continued)

FOREIGN PATENT DOCUMENTS

WO    WO-2015049059 A1 *  4/2015   ............. B64D 11/04

*Primary Examiner* — Richard R. Green
(74) *Attorney, Agent, or Firm* — Erise IP, P.A.

(57) ABSTRACT

A substructure in an aircraft cabin includes a drawer-insert accepting portion that defines multiple racks. Each rack may receive an exchangeable drawer insert. A module-accepting portion of the substructure defines an opening that includes a supporting surface, a back wall which extends upward and outward, and a lateral side wall. A module is provided for optionally installing in the module-accepting portion. The module has concealed areas upon installing that include: (i) a base adapted to rest on the supporting surface, (ii) a side wall adapted to abut the lateral side wall, and (iii) a rear wall adapted to abut the back wall. The module also has exposed surfaces upon installing that are adapted to match an existing profile of the drawer-insert accepting portion. The module-accepting portion is configured for stowing cargo in a first mode and for receiving the module in a second mode.

23 Claims, 9 Drawing Sheets

(56) References Cited

U.S. PATENT DOCUMENTS

| | | | |
|---|---|---|---|
| 7,780,114 B2* | 8/2010 | Doebertin | B64D 11/04 |
| | | | 244/118.5 |
| 8,387,916 B2* | 3/2013 | Baatz | B64D 11/04 |
| | | | 244/118.1 |
| 8,519,824 B1* | 8/2013 | Rankin | B64D 11/00 |
| | | | 244/118.5 |
| 9,321,533 B2* | 4/2016 | Cuddy | B64D 11/04 |
| 9,353,989 B2* | 5/2016 | Furr | F25D 25/025 |
| 9,661,920 B2* | 5/2017 | Ahart | A47B 88/417 |
| 10,000,287 B2* | 6/2018 | Claflin | B64D 11/04 |
| 10,017,252 B2* | 7/2018 | Jobst | B64D 11/00 |
| 2009/0267564 A1* | 10/2009 | Gerber | H02J 7/0027 |
| | | | 320/114 |
| 2013/0328361 A1* | 12/2013 | Egan | B64D 11/0636 |
| | | | 297/188.01 |

* cited by examiner

MODULAR REFRESHMENT CENTER

CROSS-REFERENCE TO RELATED APPLICATIONS

This application claims the benefit of U.S. Provisional Application No. 62/413,683 entitled "Modular Refreshment Center" and filed on Oct. 27, 2016, which is herein incorporated by reference in its entirety.

BACKGROUND

1. Field

Embodiments of this disclosure relate generally to storage systems for aircraft cabins, and more specifically to modular systems having exchangeable drawer inserts and other modular components for enabling adaptable and customizable aircraft cabins.

2. Description of the Related Art

None.

SUMMARY

In an embodiment, a substructure in an aircraft cabin is provided. The substructure includes a drawer-insert accepting portion that defines multiple racks. Each rack may receive an exchangeable drawer insert. A module-accepting portion of the substructure defines an opening that includes a substantially-level supporting surface, a back wall which extends upward and outward, and a lateral side wall. A module is provided for optionally installing in the module-accepting portion. The module has concealed areas upon installing that include: (i) a base adapted to rest on the substantially-level supporting surface, (ii) a side wall adapted to abut the lateral side wall, and (iii) a rear wall adapted to abut the back wall. The module also has exposed surfaces upon installing that are adapted to match an existing profile of the drawer-insert accepting portion.

In another embodiment, a storage system for an aircraft cabin is provided. The storage system includes a frame having a first portion to accept a plurality of exchangeable drawer inserts and a second portion providing an open cabinet. The second portion is configured for stowing cargo in a first mode and for receiving an exchangeable modular storage unit in a second mode.

In yet another embodiment, a modular galley for an aircraft is provided. The modular galley includes vertically-aligned drawers having exchangeable drawer-inserts, an open section adjacent to the vertically-aligned drawers for accepting an optional modular storage unit, and a horizontally-aligned drawer arranged beneath the open section and the vertically-aligned drawers. The horizontally-aligned drawer has a dividable bin. The drawer-inserts, the open section, the optional modular storage unit, and the dividable bin may be customized for individual flights of the aircraft.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Currently available aircraft cabinets are restricted in functionality based on their certification. Modification of the cabinets requires high replacement costs and lengthy time delays because each replacement cabinet requires special tooling for manufacture plus certification for flight. What is needed, especially for smaller aircraft, is a system that provides an ability to alter available storage configurations to accommodate versatile functions, such as those needed for different flight plans, variable numbers of passengers, and customer preferences.

Figure 1:
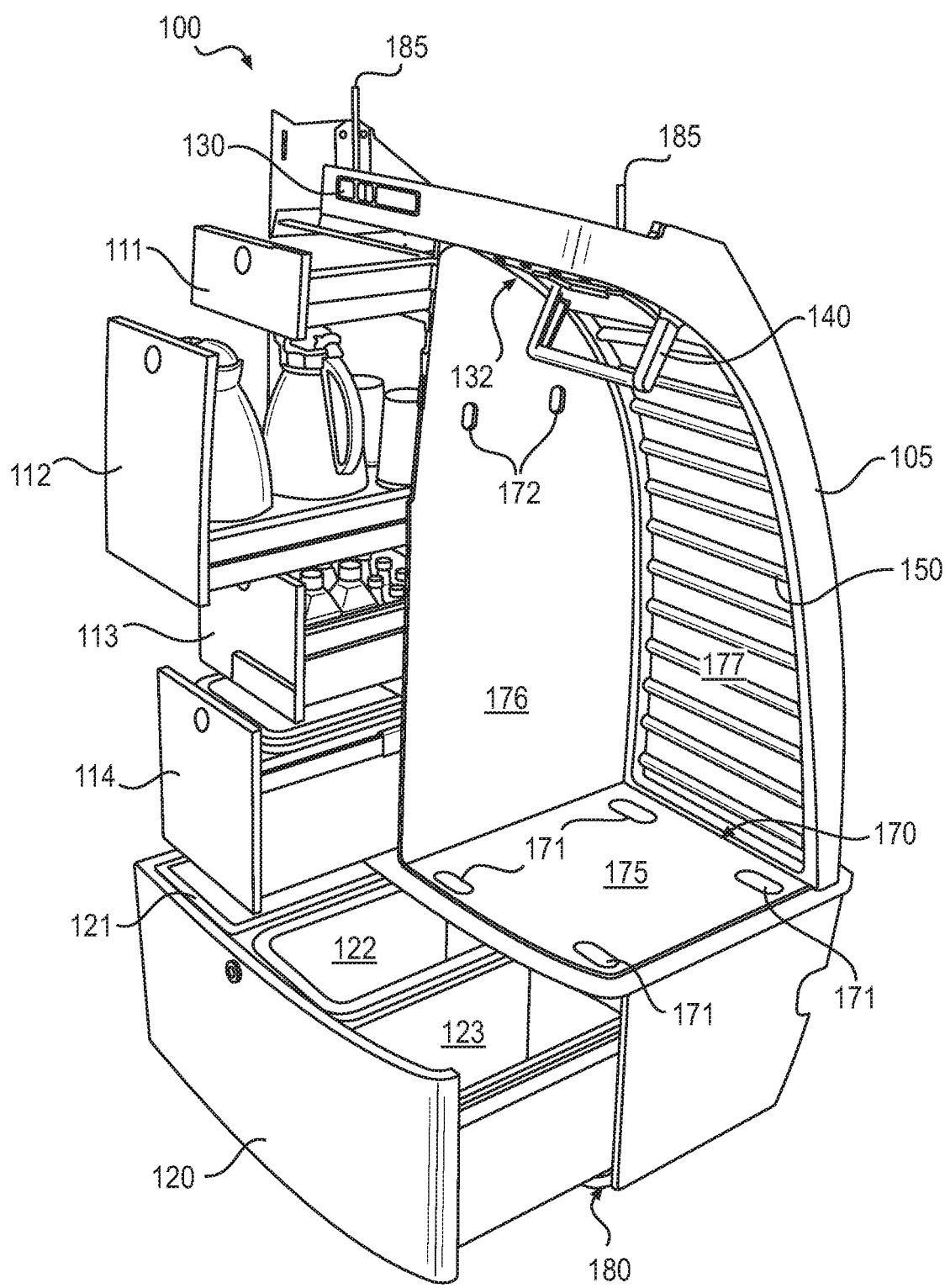
FIG. 1 is a perspective view of a modular refreshment center, in an embodiment.

FIG. 1 is a perspective view of an exemplary modular refreshment center 100. Modular refreshment center 100 provides a common substructure 105 configured to accommodate a plurality of drawer inserts as well as additional modular features for storage and amenities. Example drawer inserts include first, second, third, and fourth drawer inserts 111, 112, 113, and 114. Drawer inserts 111-114 may include standard frames that correspond with common attachment points of substructure 105 for enabling rapid exchange with compatible inserts that provide alternative interior configurations. As depicted in FIG. 1, drawer inserts 111-114 are aligned vertically with respect to one another. However, other arrangements are possible without departing from the scope hereof. An open storage bin 120 is provided for additional storage, and an open cabinet 170 is provided, as further described below.

Substructure 105 is for example a frame designed to meet all mandated structural loads required by relevant aircraft certification authorities. Connectors 185 are for example quick-release pin mechanisms used to attach substructure 105 to the aircraft. Any aircraft outfitted with substructure 105 may exchange inserts and modular units with any other similarly outfitted aircraft.

First drawer insert 111 may be configured with a bin having one or more compartments. An example of first drawer insert 111 is a bin with a plurality of compartments (e.g., for storing a plurality of condiments). Second drawer insert 112 may be configured for securely storing stacks of cups and carafes during taxiing and flight. Third drawer insert 113 may similarly be configured for securely storing bottles in an upright orientation during taxiing and flight. Fourth drawer insert 114 may be an insulated compartment configured for storing ice. For example, drawer insert 114 includes a double-walled bin for providing insulation (see e.g., bin 163, FIG. 4).

Open storage bin 120 is aligned horizontally beneath fourth drawer insert 114 and open cabinet 170. Additional modular storage inserts may be provided in open storage bin 120. For example, a first divider 126 and a second divider 127 may be adjustably positioned for separating portions of open storage bin 120 (see also FIG. 9). The different portions may remain open or accept modular storage inserts such as a trash bin 121 and a doubled-walled bin 122 for ice storage. As depicted in FIG. 1, an open portion 123 is provided without a modular storage insert but may be capable of accepting another storage insert or any other appropriately sized item.

In certain embodiments, a pull-out surface (not shown) may be included amongst the drawer inserts 111-114 to provide a working surface, such as a cutting board, that is conducive to preparing food and beverages. Upon retrieving the pull-out surface from substructure 105, a locking mechanism may be included to maintain the pull-out surface in an extended configuration while in use.

Open cabinet 170 is defined by a lower supporting surface 175, by a side wall 176, and by a back wall 177. In certain embodiments, lower supporting surface 175 is substantially level. Back wall 177 extends upwardly and inwardly to substantially conform with the shape of an interior cabin wall. For example, back wall 177 may be a back portion of open cabinet 170 or a curved back wall. Lower supporting surface 175, side wall 176, and back wall 177 may be protected with a protective liner, such as a cargo-liner having abrasion resistant surfaces. Further, back wall 177, in some embodiments, includes a protective liner having molded ribs 150.

Additional features that enhance versatile utility are included in open cabinet 170. For example, lights 132 may include recessed pin lights and/or a recessed strip light. Lights 132 may further include light-emitting diodes (LEDs), such as LED pin lights intended for task lighting and/or a plurality of LEDs configured longitudinally along a flexible strip, string, or tape intended for ambiance lighting. A retractable rod 140 may be deployed for use as a garment hanger and retracted when not in use (e.g., by rotating and counter-rotating). Beneath open storage bin 120 is a toe-kick 180, which includes a recessed portion to enable a user's feet to partially extend beneath open storage bin 120 when it is closed. Toe-kick 180 may be covered with a durable and malleable material such as rubber.

Cargo may be stored in open cabinet 170 and secured using built-in equipment. For example, straps and/or cargo tie-down netting (not shown) are used to tie down cargo to one or more recessed receptacles. In certain embodiments, recessed receptacles 171 are located in lower supporting surface 175 for receiving the straps and/or netting (see e.g., FIGS. 1 and 2). In some embodiments, recessed receptacles 172 are located in side wall 176 (see e.g., FIGS. 1 and 3). As depicted in FIG. 1, lower supporting surface 175 includes four recessed receptacles 171, but modular refreshment center 100 may include greater than or less than four receptacles 171, without departing from the scope hereof. Similarly, recessed receptacles 172 may be located in alternative portions of open cabinet 170, such as back wall 177, without departing from the scope hereof.

Figure 2:
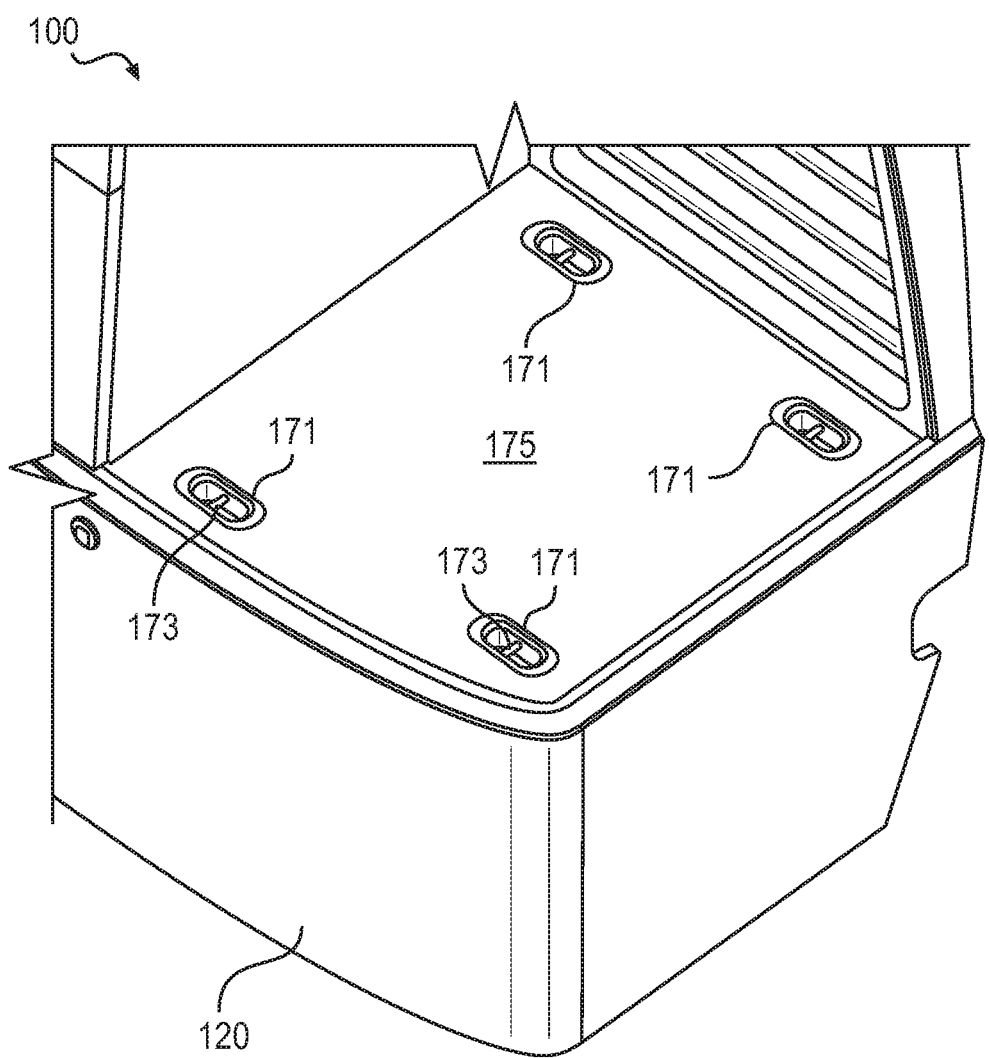
FIG. 2 is a close-up perspective view of a lower supporting surface of the modular refreshment center of FIG. 1.

FIG. 2 is a perspective view of lower supporting surface 175 having four recessed receptacles 171. Each of recessed receptacles 171 includes a crossbar 173 inside the receptacle (not all crossbars are enumerated for clarity of illustration). A space exists underneath crossbar 173 such that a strap, clip, carabiner, or similar device may be attached to crossbar 173 for securing tie-downs, straps, and netting. By being recessed inside recessed receptacle 171, crossbar 173 does not protrude into open cabinet 170 nor interfere with items placed on lower supporting surface 175.

Figure 3:
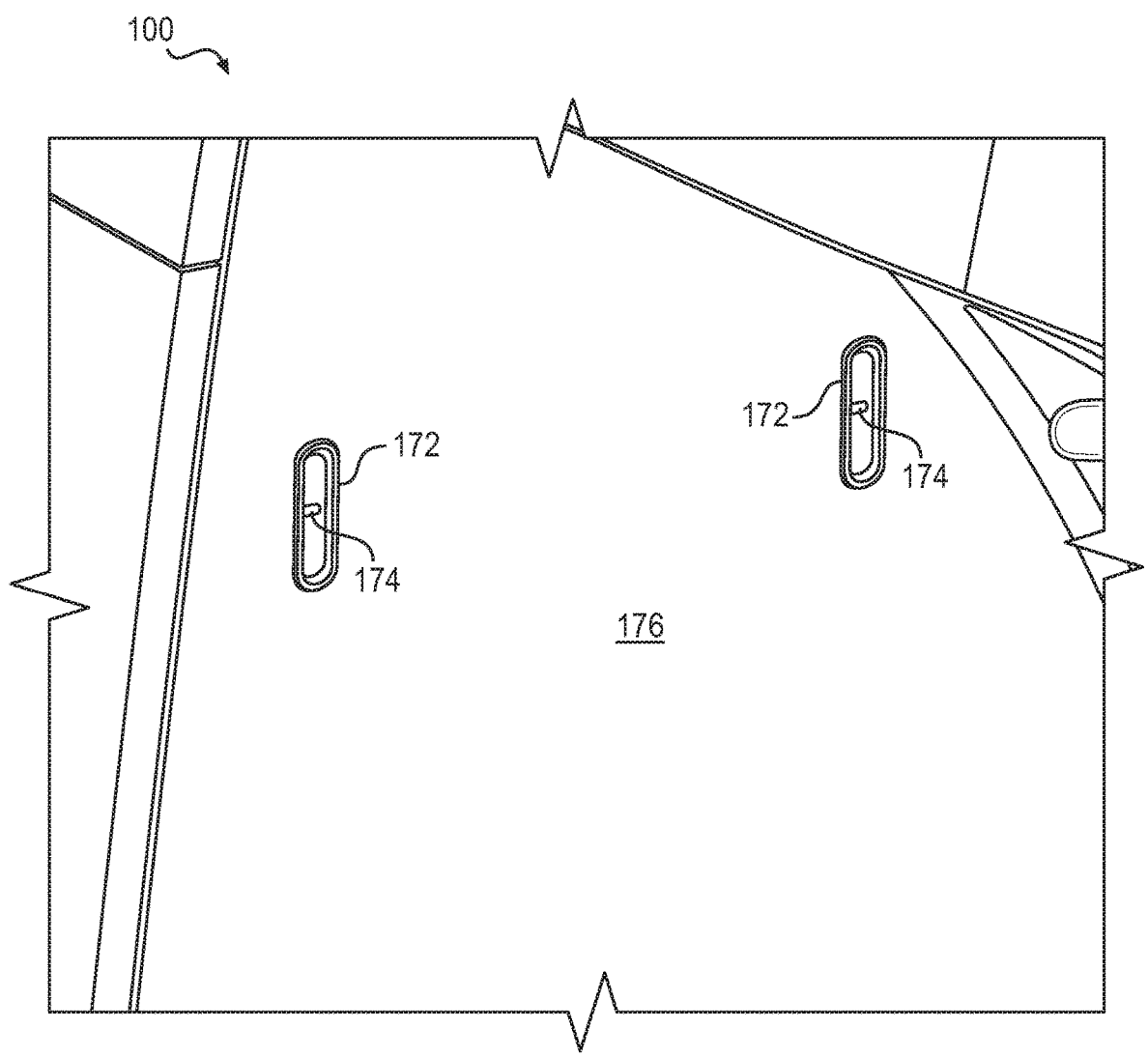
FIG. 3 is a close-up view of recessed receptacles located in a side wall of the modular refreshment center of FIG. 1.

FIG. 3 is a close-up view of recessed receptacles 172 located in side wall 176. A crossbar 174 is an example of crossbar 173, FIG. 2 located in recessed receptacles 172 for securing tie-downs, straps, and netting by attachment with straps, clips, and carabiners. By being recessed within recessed receptacle 172, crossbar 174 does not protrude into open cabinet 170 nor interfere with items placed hanging from retractable rod 140.

Figure 4:
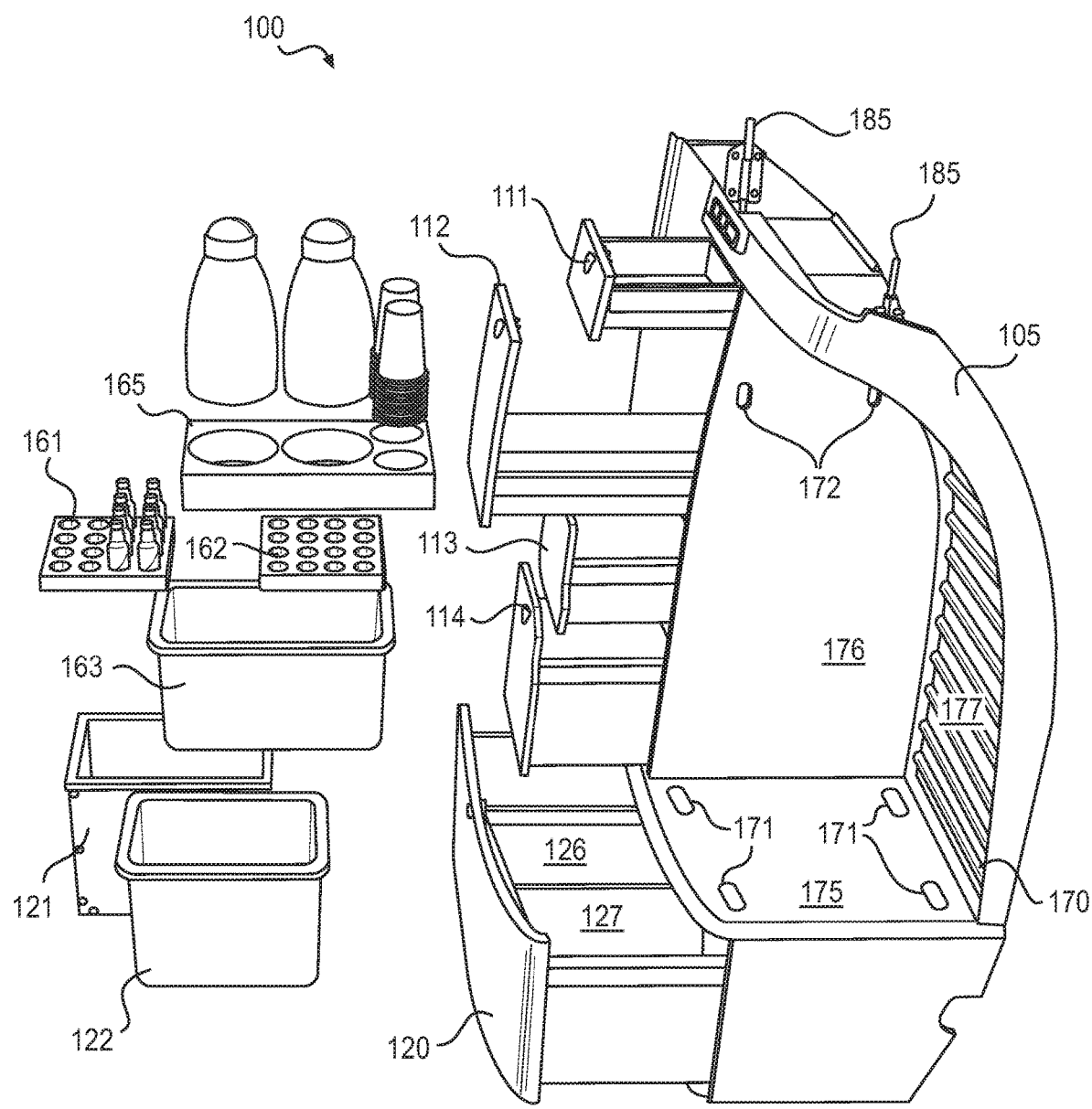
FIG. 4 is an exploded side view of the modular refreshment center of FIG. 1.
Figure 9:
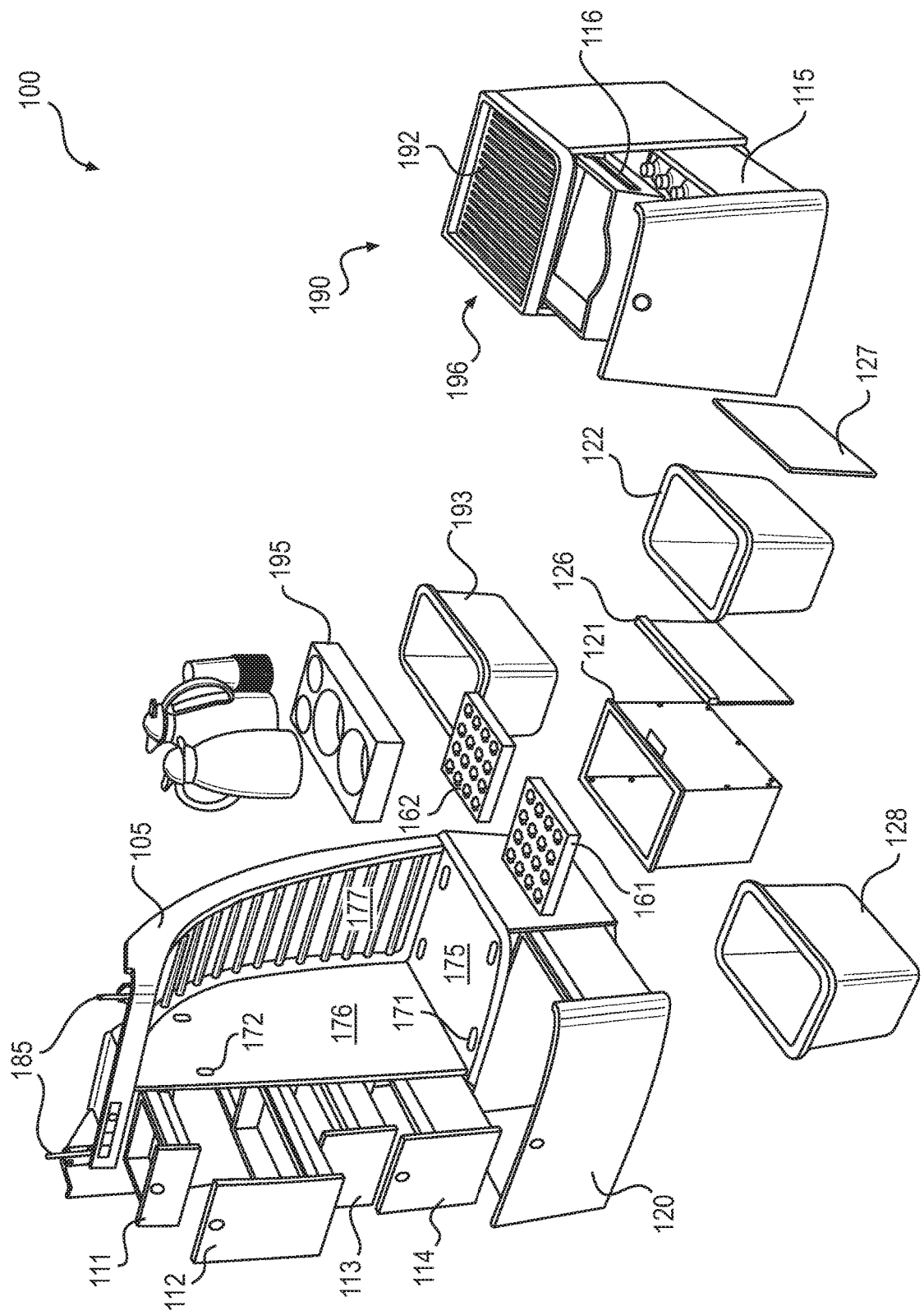
FIG. 9 is an exploded view of the modular refreshment center and the optional modular storage unit of FIG. 5.

FIG. 4 is an exploded side view of modular refreshment center 100. In certain embodiments, drawer inserts 111-114 may include interchangeable liners, such as molded liners, that enable further customization to accommodate a variety of functions (e.g., to hold eating utensils, condiments, liquor miniature bottles, water bottles, wine glasses, or carafes). Exemplary interchangeable liners depicted in FIG. 4 include a molded liner 165 adapted to hold two carafes upright and to hold two stacks of cups and configured to insert into drawer insert 112. Drawer insert 113 is configured to receive a first molded liner 161 and a second molded liner 162 each adapted to hold a plurality of bottles upright. Double-walled bin 163 provides insulation for storing ice in fourth drawer insert 114. Molded liners 161, 162, and 165 are also depicted in FIG. 9. Because drawer inserts 111-114 may be rapidly exchanged with compatible inserts that provide alternative interior liner configurations, customization of the modular refreshment center 100 may be provided for individual flights.

Figure 5:
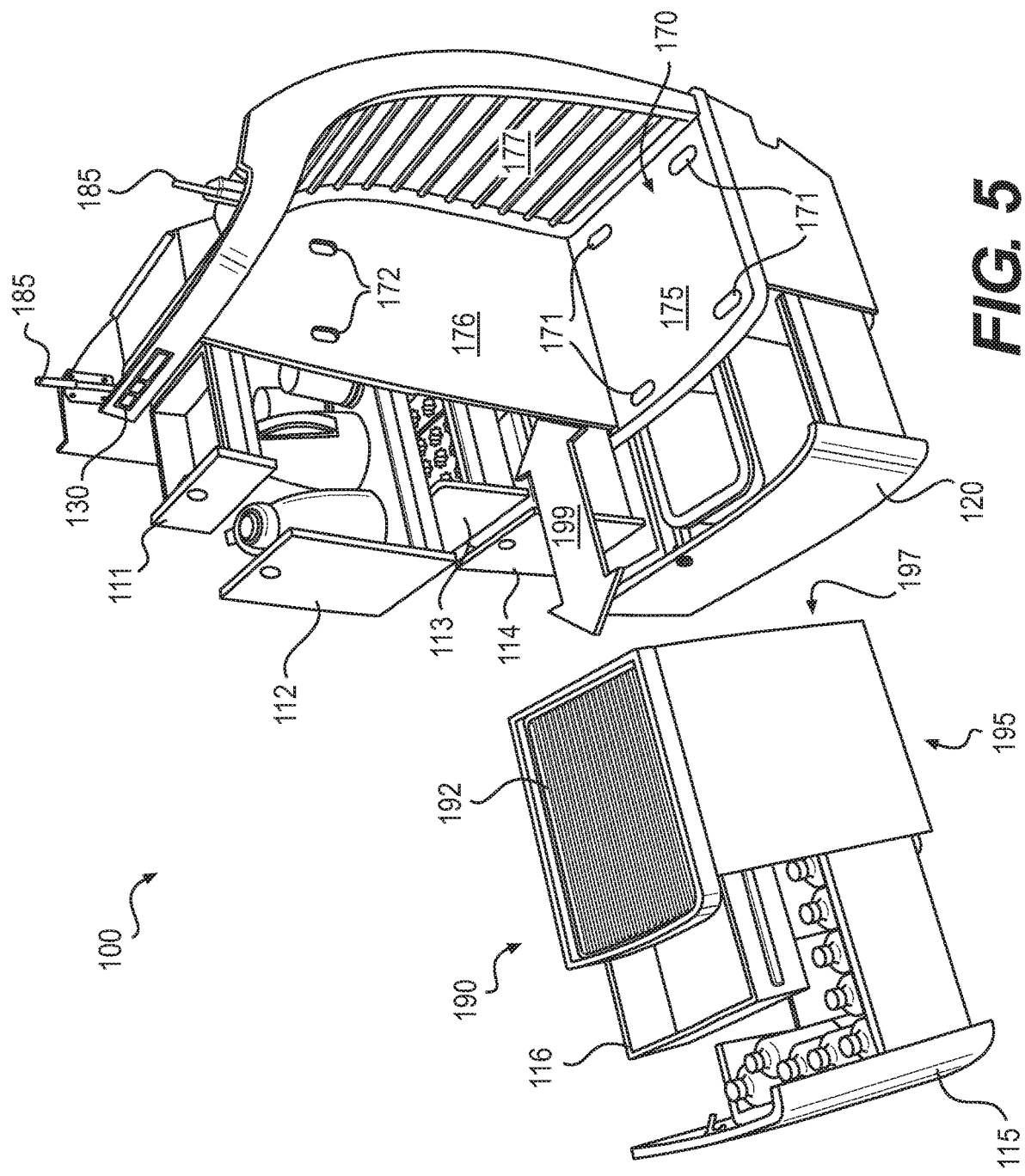
FIG. 5 depicts one embodiment of an optional modular storage unit removed from the modular refreshment center.

FIG. 5 depicts an optional modular storage unit 190 removed from modular refreshment center 100. Modular storage unit 190 is, in certain embodiments, configured for installing upon the lower supporting surface 175 in open cabinet 170. As indicated by arrow 199, modular storage unit 190 may be installed and uninstalled as needed. Top surface 192 may be configured as a work surface or storage surface for setting small appliances or personal items. Optional features of modular storage unit 190 may include drawers, smart phone docking stations, and small appliances such as coffee/espresso makers. Electrical power may be provided to modular storage unit 190 via a battery pack or by electrical connection through substructure 105. As depicted in FIG. 5, a main drawer 115 and a top-drawer insert 116 may be used for providing additional storage. Other configurations for modular storage unit 190 may of course be contemplated, especially since the main advantage provided by unit 190 is that it is removable, thereby enabling exchange with a compatible unit providing alternative features.

Figure 6:
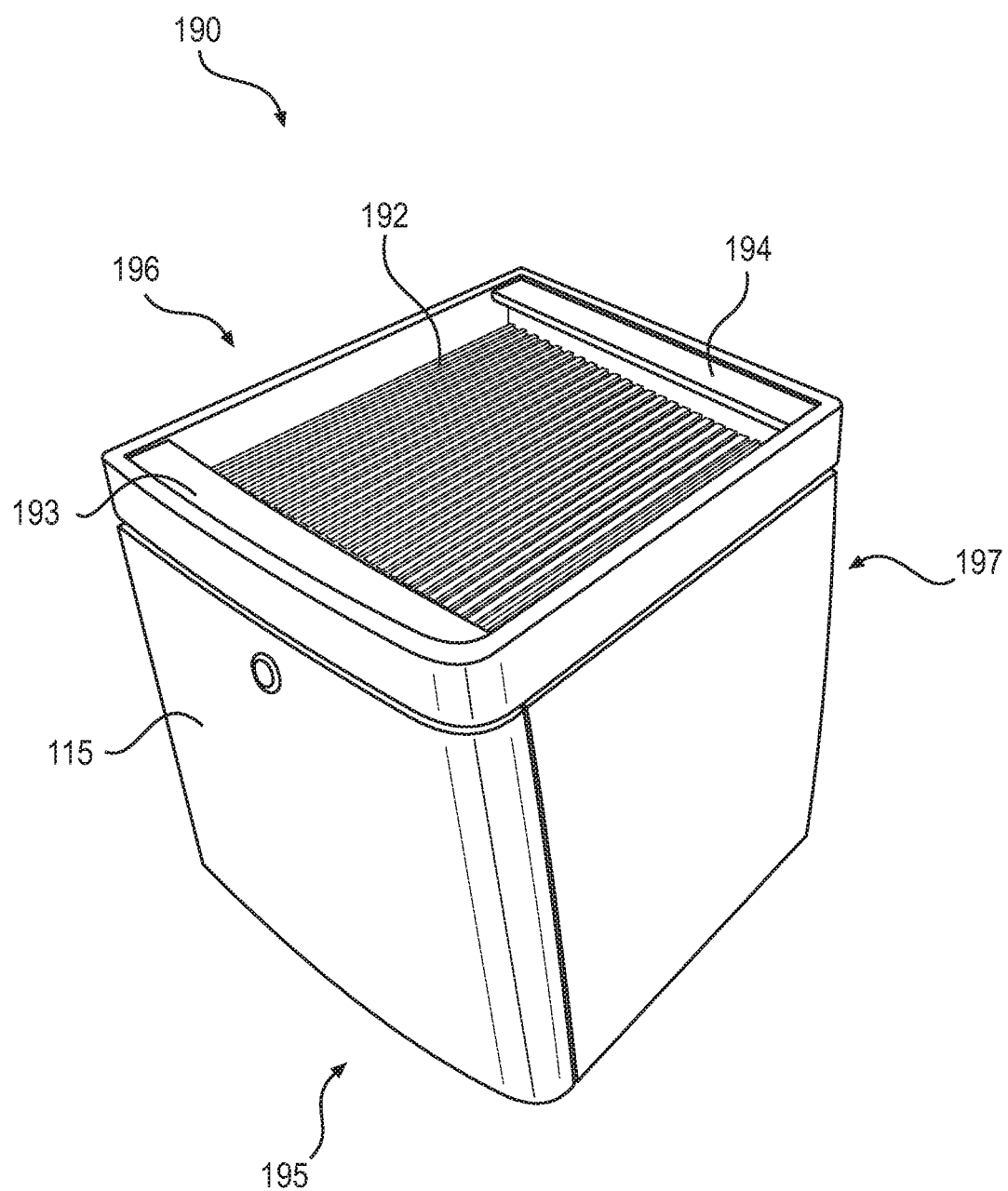
FIG. 6 is a perspective view of an optional modular storage unit, in an embodiment.
Figure 8:
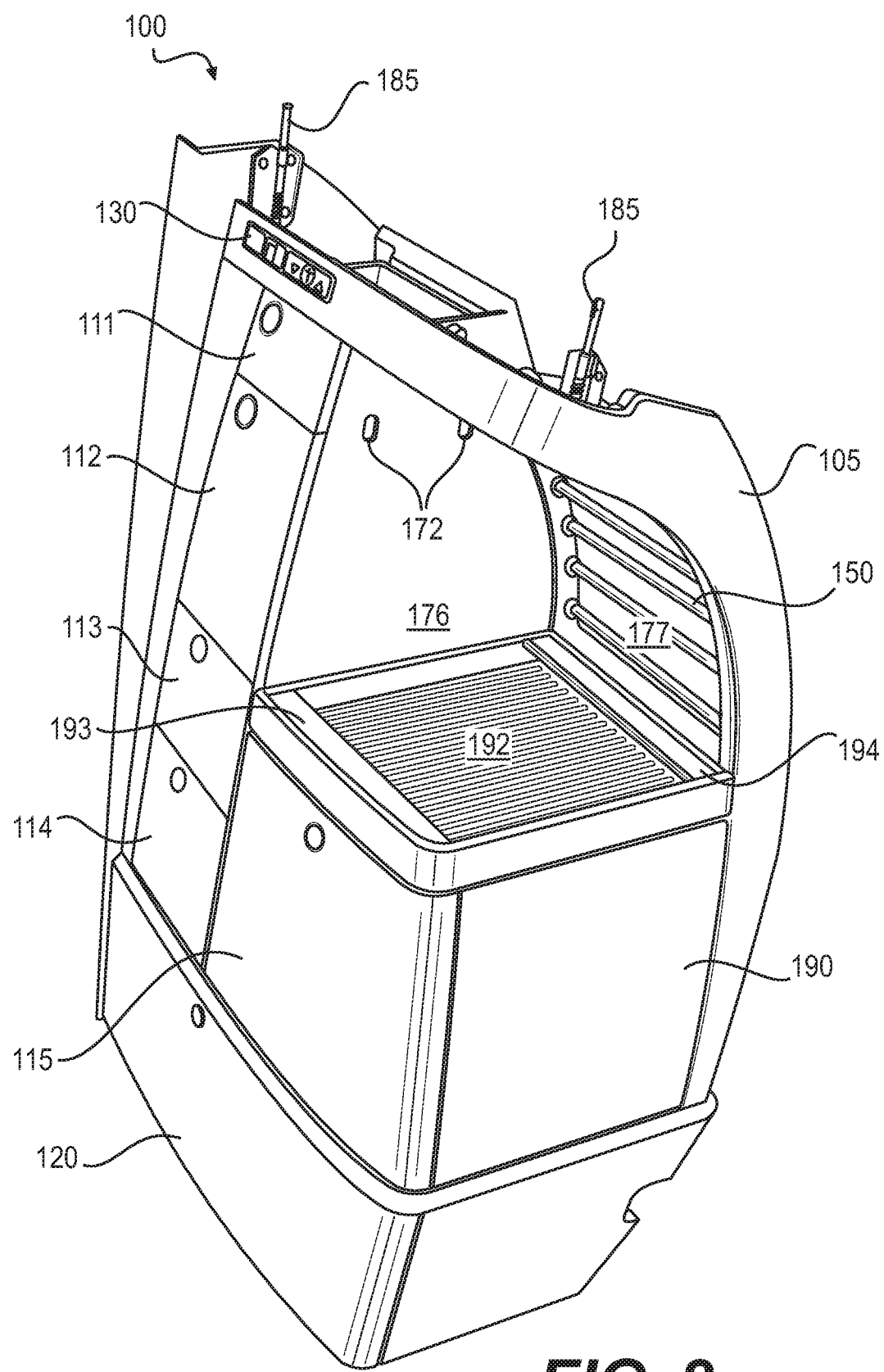
FIG. 8 is a perspective view of the optional modular storage unit of FIGS. 6 and 7 installed in the modular refreshment center of FIG. 1.

FIG. 6 is a perspective view of optional modular storage unit 190 having a first handle 193 and a second handle 194. First and second handles 193, 194 enable modular storage unit 190 to be installed onto substructure 105 (as depicted in FIG. 8) an uninstalled by hand. Modular storage unit 190 provides the user with the capability to easily and quickly change the functionality of the modular refreshment center 100 without needing to purchase and swap-out an entirely different substructure. This modularity enhances the ability to customize the aircraft cabin depending on mission-specific needs of a flight, where utility, weight, and personal preferences are important.

Modular storage unit 190 is configured for receipt by open cabinet 170, which serves as a module-accepting portion of modular refreshment center 100. In other words, modular unit 190 provides a module having exposed surfaces upon installation, such that the exposed surfaces are adapted to match a profile existing in open cabinet 170. The exposed surfaces may include (i) a base 195 adapted to rest on lower supporting surface 175, (ii) a side wall 196 adapted to abut side wall 176, and (iii) a rear wall 197 adapted to abut the upwardly and inwardly extending back wall 177.

Figure 7:
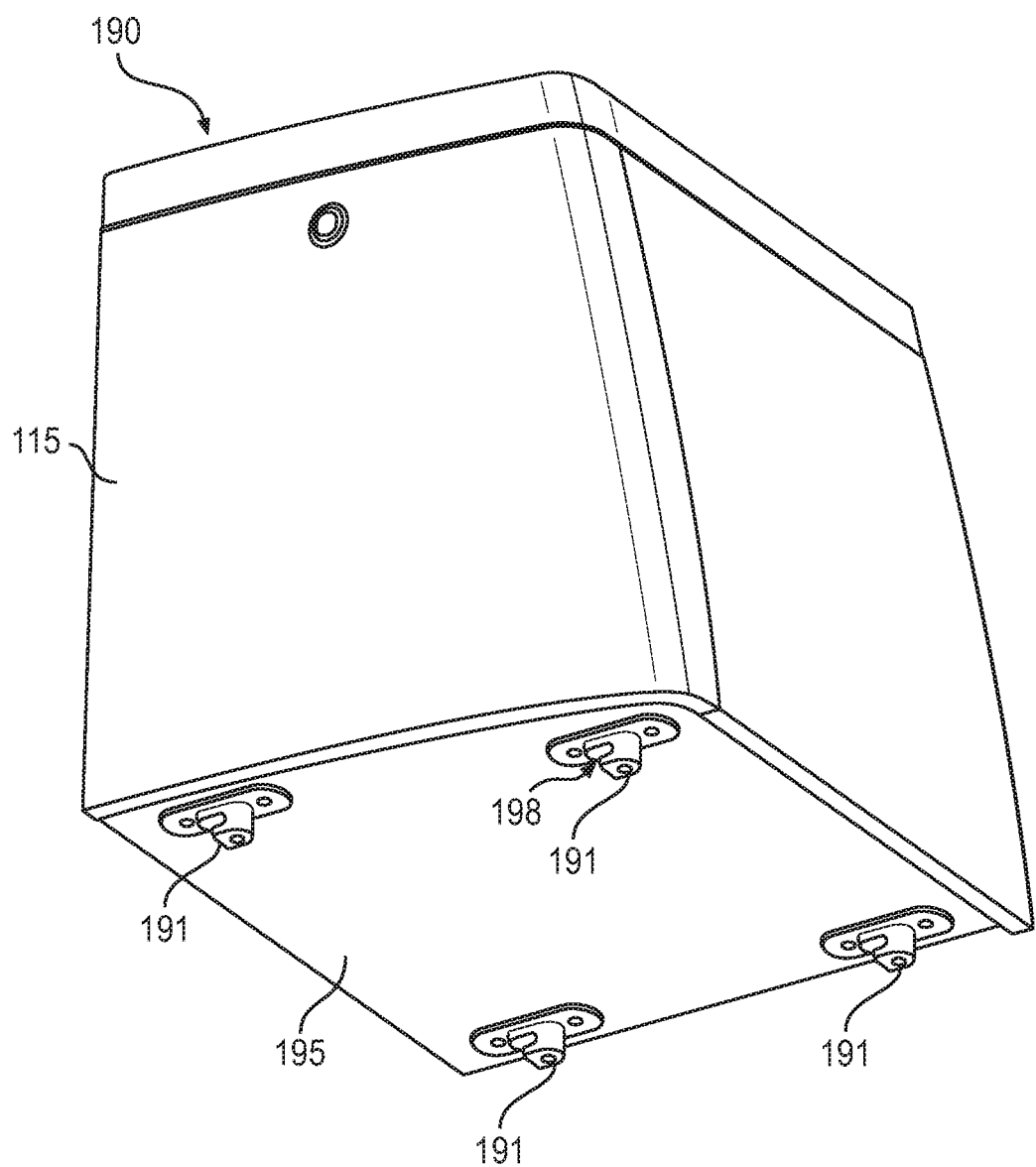
FIG. 7 is another perspective view of the optional modular storage unit of FIG. 6.

FIG. 7 is a perspective view of base 195 of optional modular storage unit 190. For securing modular storage unit 190 in open cabinet 170, one or more quick disconnect or other interlocking features may be built into open cabinet 170 for receiving corresponding features on modular storage unit 190. In certain embodiments, recessed receptacles 171, which may be used for connecting straps or netting to tie down cargo as described above, are also adapted to receive interlocking features of modular storage unit 190. In the embodiment depicted in FIG. 7, base 195 includes four protrusions 191 adapted to insert into a corresponding one of recessed receptacles 171 in lower supporting surface 175 when modular storage unit 190 is installed in open cabinet 170. Each of protrusions 191 include a slot 198 adapted to receive a respective crossbar 173. Not all slots 198 are enumerated in FIG. 7 for clarity of illustration. Following insertion of protrusions 191 into the respective receptacles 171, modular storage unit 190 may be secured within open cabinet by inserting crossbars 173 into corresponding slots 198.

FIG. 8 is a perspective view of modular refreshment center 100 with modular storage unit 190 installed. When closed, drawer inserts 111-114, main drawer 116, and open storage bin 120 provide an aesthetically appealing and visually unifying façade. Retractable rod 140 is preferably stowed in the retracted position when modular storage unit 190 is installed. Recessed receptacles 172 enable tie-downs, straps, and netting to be attached for securing small cargo (e.g., on top of modular storage unit 190).

FIG. 9 is an exploded view of modular refreshment center 100 and optional modular storage unit 190. Modular components of open storage bin 120 include trash bin 121, first and second dividers 126, 127, doubled-walled bin 122. An additional doubled-walled bin 128 is also depicted, which may optionally be installed in open portion 123 (see e.g., FIG. 1).

In a first utilization mode, the lower portion of open cabinet 170 may remain open (e.g., as depicted in FIG. 1). With modular storage unit 190 uninstalled, modular refreshment center 100 is adapted for hanging garments from rod 140 and for storing carry-on luggage (e.g., small suitcases, briefcases, and laptop cases) or small to medium-sized insulated containers (e.g., coolers). Luggage and containers may be secured by tying down with straps and/or netting that connect to recessed receptacles 171, 172. This configuration may be well suited for business travelers, for example.

In a second utilization mode, modular storage unit 190 is installed, making modular refreshment center 100 adapted for increased access to consumables (e.g., for long one-day flights where passengers have less luggage but an increased need for food, drinks, snacks or other daytrip items).

An aircraft outfitted with substructure 105 may optionally include extra modular storage units 190 (e.g., having different configurations), which allows rapid reconfiguration of modular refreshment center 100 to expand its capability for accommodating storage, work surface areas, and increased functionality (such as accommodating catering trays, extra ice, food and drinks, and/or trash storage).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A modular storage system for an aircraft cabin, comprising:
 a substructure having a curved rear wall shaped to fit against a fuselage wall inside the aircraft cabin, the substructure comprising:
  a plurality of connectors adapted to attach the substructure to the fuselage wall;
  a drawer-insert accepting portion defining a plurality of racks each configured to receive an exchangeable drawer insert; and
  a module-accepting portion defining an opening, the module-accepting portion including an upward-facing supporting surface, a forward-facing curved back panel abutting the curved rear wall, a lateral-facing side wall abutting the drawer-insert accepting portion, and an open side opposite the lateral-facing side wall; and
 a module configured for installing in the module-accepting portion, the module comprising:
  concealed areas upon installing that include: (i) a base adapted to rest on the upward-facing supporting surface, (ii) a side wall adapted to abut the lateral-facing side wall, and (iii) a rear wall adapted to abut the forward-facing curved back panel; and
  exposed surfaces upon installing, the exposed surfaces adapted to match an existing profile of the drawer-insert accepting portion.

2. The substructure of claim 1, further comprising a retractable rod located in an upper portion of the forward-facing curved back panel, wherein the module-accepting portion, when the module is removed, provides an open area for hanging garments from the retractable rod.

3. The substructure of claim 1, wherein the upward-facing supporting surface further includes recessed receptacles adapted for securing luggage via one or more of straps and netting.

4. The substructure of claim 3, wherein the module comprises protrusions extending from the base, the protrusions being adapted to insert into the recessed receptacles for securing the module to the module-accepting portion.

5. The substructure of claim 1, wherein the forward-facing curved back panel further includes lights for illuminating the upward-facing supporting surface when the module is removed and for illuminating the module when the module is installed.

6. The substructure of claim 1, wherein the module further comprises at least one exchangeable drawer insert.

7. The substructure of claim 1, wherein the module further comprises at least one handle for moving the module, the at least one handle being integrated into a top surface of the module.

8. A storage system for an aircraft cabin, comprising:
 a frame having a curved back wall, the frame being configured for securely installing against an interior cabin wall inside an aircraft cabin, the frame having a first portion and a second portion adjacent the first portion;

the first portion having a plurality of racks;

a plurality of exchangeable drawer inserts configured for inserting into the plurality of racks, respectively;

the second portion providing an open cabinet lacking an exterior side wall; and an exchangeable modular storage unit, wherein the second portion is remains open for receiving cargo in a first mode and for receiving the exchangeable modular storage unit in a second mode.

9. The modular refreshment center of claim 8, wherein the exchangeable modular storage unit further comprises at least one exchangeable drawer insert and a working surface.

10. The modular refreshment center of claim 8, wherein at least one of the plurality of exchangeable drawer inserts further includes an interchangeable liner.

11. The modular refreshment center of claim 10, wherein the interchangeable liner is configured for securely storing containers of liquids in an upright configuration.

12. The modular refreshment center of claim 10, wherein the interchangeable liner includes a double-walled bin for storing ice.

13. The modular refreshment center of claim 8, wherein at least one of the plurality of exchangeable drawer inserts includes an adjustable divider for providing separate storage portions.

14. The modular refreshment center of claim 8, wherein the plurality of exchangeable drawer inserts each comprise a standard frame such that the drawer inserts are transferrable with compatible drawer inserts of other aircraft equipped with the plurality of racks.

15. A modular galley for an aircraft, comprising:
a substructure configured for rapid installation and deinstallation within an aircraft interior, the substructure comprising:
  a curved back wall that conforms with the shape of an interior cabin wall of an aircraft;
  a plurality of vertically-aligned drawers having exchangeable drawer-inserts in front of a first portion of the curved back wall;
  an open section in front of a second portion of the curved back wall, the open section having a first side and a second side opposite the first side, wherein the first side comprises a side wall adjacent to the plurality of vertically-aligned drawers and the second side is open to the exterior of the substructure without a side wall; and
  a horizontally-aligned drawer arranged beneath the open section and the plurality of vertically-aligned drawers; and
a modular storage unit configured for mounting to the open section in a first mode, and the modular storage unit configured for removal from the aircraft in a second mode such that the open section remains open.

16. The modular galley of claim 15, wherein the exchangeable drawer-inserts include interchangeable molded liners.

17. The modular galley of claim 15, wherein the open section includes lights, a retractable rod for garment hanging, a substantially-level platform for receiving the modular storage unit, and recessed receptacles for receiving straps to tie down cargo and for receiving corresponding protrusions of the modular storage unit.

18. The modular galley of claim 15, wherein the modular storage unit includes a top surface adapted to provide a working surface and a small storage space.

19. The modular galley of claim 18, wherein the top surface includes at least one handle for removal and installation of the modular storage unit.

20. The modular galley of claim 18, wherein the top surface includes electrical receptacles for plugging in personal devices and small appliances.

21. A system for an aircraft, comprising:
a frame having a back portion configured to conform to a curved shape of an aircraft interior, the frame having at least one connector for rapidly installing and uninstalling from the aircraft interior;
the frame having a drawer-insert accepting portion defining a plurality of racks each configured to receive an exchangeable drawer insert;
the back portion at least partially defining a receiving space, the receiving space configured to form an open corner that is open to the aircraft interior without a side wall or front enclosure, wherein the receiving space is adaptable into a first utilization mode and a second utilization mode;
the receiving space, in the first mode, being configured for hanging items; and
a modular storage unit configured for mounting to the receiving space in the second mode.

22. The system of claim 21, wherein an upward location of the back portion includes a retractable rod used for hanging the items.

23. The system of claim 21, wherein the container for storing cargo used in the second mode is configured to conform to the shape of the back portion.

* * * * *